UNITED STATES PATENT OFFICE.

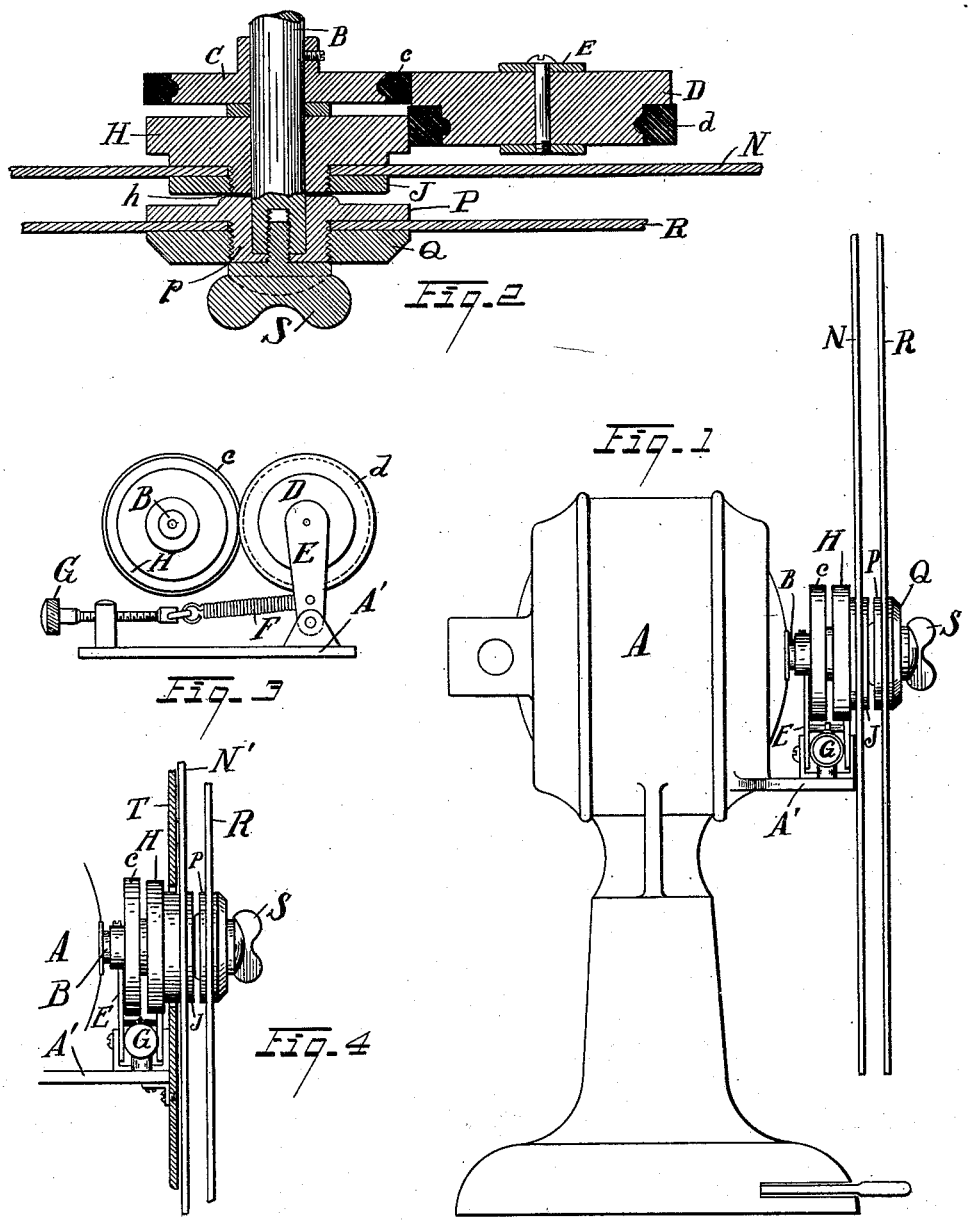

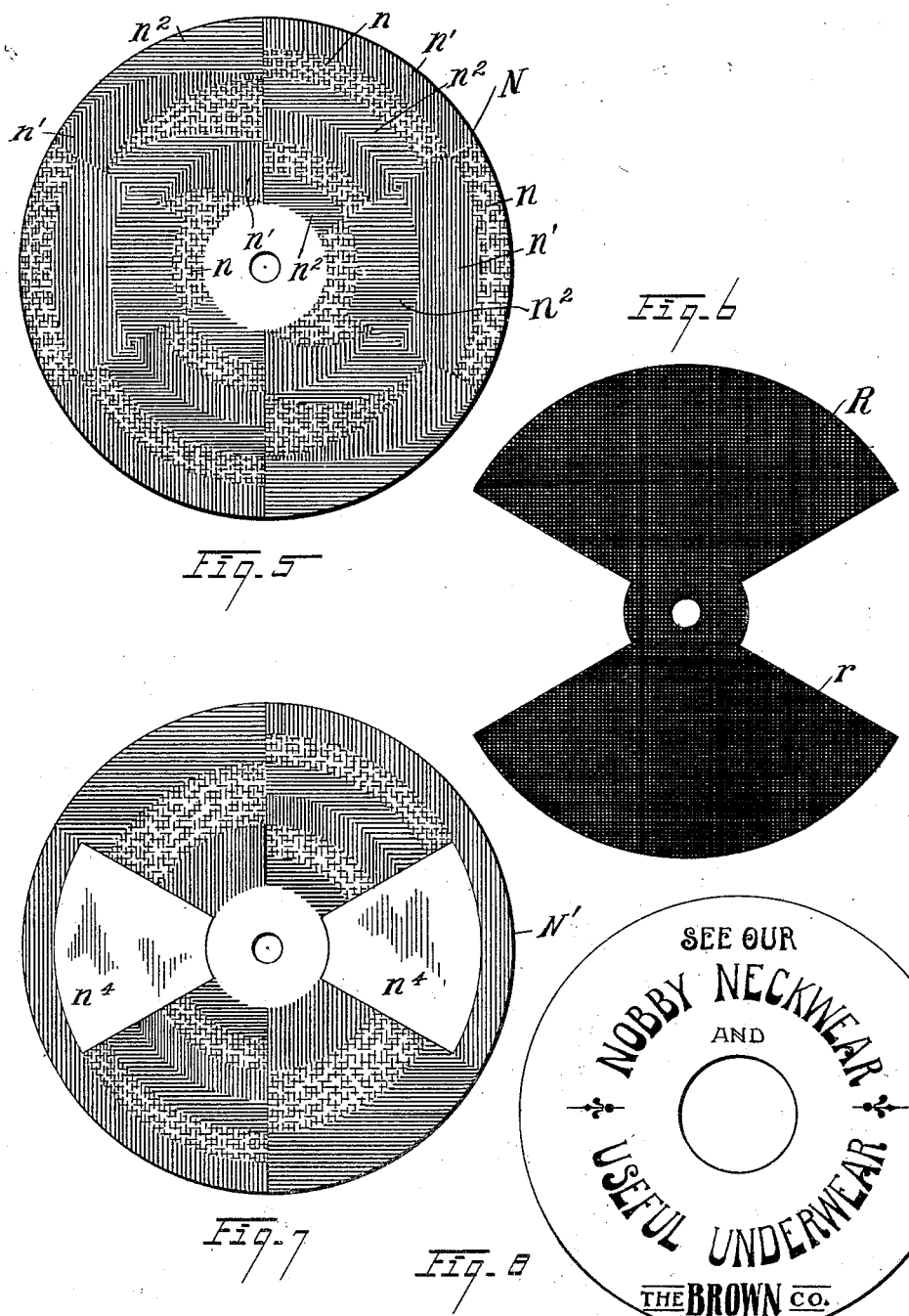

WILLIAM P. DUN LANY, OF CLEVELAND, OHIO, ASSIGNOR TO JOHN A. LANNERT, OF CLEVELAND, OHIO.

ADVERTISING APPARATUS.

No. 889,590.  Specification of Letters Patent.  Patented June 2, 1908.

Application filed June 7, 1906. Serial No. 320,514.

*To all whom it may concern:*

Be it known that I, WILLIAM P. DUN LANY, a citizen of the United States, residing at Cleveland, in the county of Cuyahoga and State of Ohio, have invented a certain new and useful Improvement in Advertising Apparatus, of which the following is a full, clear, and exact description, reference being had to the accompanying drawings.
The object of this invention is to produce a very simple and neat optical illusion device such as may be used to attract attention for advertising purposes or for other uses.

The invention comprises a rotatable disk having on it various colors and a rotatable shield and means for causing one to shift with reference to the other so as to change the apparent colors displayed.

A further object of my invention is to provide the device with means for periodically disclosing a third member apparently visible through the shield and disk, thus further complicating the illusion. The means by which this is accomplished as well as the other characteristics of the invention are hereinafter more fully described.

The drawings clearly illustrate the invention.

Figure 1 is a side illustration of a complete embodiment of the device; Fig. 2 is a horizontal section of the same through the shaft and driving wheels; Fig. 3 is a side elevation of the friction drive; Fig. 4 is an edge view showing the employment of an additional advertising disk; Fig. 5 is a view representing the color disk; Fig. 6 is a view representing the shield; Fig. 7 is a view showing the formation of the color disk when a third advertising disk is employed; and Fig. 8 is a view of such advertising disk.

Referring to the parts by letters, A represents a suitable motor having an armature shaft B. Secured to this shaft is a driving wheel C, having a soft rubber tire $c$. This tire is in frictional contact with an idler wheel D, mounted in a fork E, and drawn against the tire $c$, by a spring F, adjusted by a screw G. The fork E and screw G are carried by a bracket A' extending from the motor frame.
Mounted on the idler D, is likewise a rubber tire $d$, which bears against a wheel H, loose upon the shaft B. As shown the peripheries of the wheel H and the tire $c$, are of slightly different diameters, the result being that the wheel H, and the shaft B, rotate at slightly different speeds.

The hub of the wheel H has formed on it a screw thread $h$ which is adapted to take a nut J, whereby there may be clamped to this wheel the disk N.

P represents a collar or head having a screw threaded hub on which is a nut Q, whereby the shield disk R is clamped to the head. This head is adapted to fit over the end of the shaft B, being rigidly held thereon by a thumb screw S, screwing through the head into the shaft.

If the disk N be provided with a series of different colors and the disk R, be black with openings or transparencies in it, an optical illusion is presented when the disks are rotated. A series of concentric colored rings appear, which, as the shield shifts with reference to the color disk, gradually change from one size and color into another. The nature and amount of the change depends upon the formation of the color, the amount of opening in the shield disk, and the difference in the speeds of two disks.

As shown in Figs. 5 and 6, the color disk is divided into six sectors, in which opposite ones have the same color scheme, and the shield disk has its transparencies formed by cut out portions which are each equal in size to one of the sectors of the color disk. Any suitable colors may be employed on the color disk, but I deem brilliant colors preferable; while the shield disk should be black.

As illustrated in Fig. 5 the bands $n$ are of one color, yellow for example; the bands $n'$ red; the bands $n^2$ blue. With such a disposition of colors, if the transparent spaces $r$ in the shield disk are opposite the middle right and left hand sectors, for example, the colors will appear (counting from the periphery inwards) first, a narrow band of yellow, then a wide band of red, then a wide band of blue, then a narrow band of yellow.

Now in the shifting of the shield disk each opening $r$ will disclose a portion of the color sector just referred to and a portion of the sector adjacent thereto, for example, a portion of the middle right hand and left hand secors and a portion of the upper right hand sector and lower left hand sector. This introduces a change in the apparent color of the bands, for the narrow yellow band $n$ of the middle sector is mingled with the narrow red band $n'$ of the adjacent sector, while the yellow band of the adjacent sector is mingled with a portion of the red band of the middle sector, thus producing a broad band of orange. Next the inner portion of the red band of the middle sector mingles with the narrow blue band of the adjacent sector, while the narrow red band of the sector mingles with the outer portion of the blue band of the inner sector, making a wide band of purple. Similarly the yellow and blue bands mingle, making a wide band of green. The depth of these colors vary according to the proportions of the two sectors visible.

In the upper left hand sector and lower right hand sector, as shown, the bands are given the form of a segment of a crescent, the object being to give the bands the appearance of traveling in or out. The apparent direction of movement of the bands depends upon which direction the shield disk is moving relative to the color disk. This apparent travel of the bands adds considerable interest to the illusion, for not only do the bands change color but they appear to suddenly come from the outer edge of the disk and move inwardly or vice versa, unavoidably suggesting to the observer the question: "How is it done?"

The construction so far described is of great utility as an advertising device in attracting attention to a store window, for example.

I may make the illusion more complex by arranging the parts described so that a third member behind the shield and disk becomes periodically visible. This third member carries a suitable facing which may take any desirable form. As shown in the drawing this facing is comparatively dark on a light background and is in the form of letters arranged into words, which may thus make a specific advertisement. To enable the third member to become periodically visible, I make sight openings in the color disk N as shown at $n^4$ on the disk N' in Fig. 7. These sight openings may be placed as shown, and they may be made by printing the disk in opaque color on transparent background, as a piece of celluloid, or they may be openings in an opaque disk. I use the term sight opening as covering it whatever way it is accomplished, and the same applies to the shield R, which for convenience I call a disk, though it may not be completely circular.

Behind the disk N' having the sight openings, I mount the stationary disk T which loosely surrounds the rotating hub H, and is held by the bracket A', and may have on it any suitable facing, as a legend or advertisement as shown in Fig. 8. While the openings in the disk R are over the colored portion of the disk N', the advertisement on the disk T is hidden. The difference in the rate of rotation of the disks N' and R, bring the openings $r$ approximately opposite the openings $n^4$ for a number of revolutions, and the speed of rotation is sufficient so that the openings $n^4$ make a complete circle quicker than the eye can detect, whereupon the whole disk appears to become transparent and the advertising may be easily read through it.

I claim:

1. The combination of a rotatable color member having a sight opening, a rotatable shield member partially hiding the color member, means for giving relatively different rotations to the two members, and a stationary third member located behind the color member and periodically visible through it.

2. The combination of a color disk, a screen disk having a portion through which the color disk may be seen, means for rotating said two disks and moving one relatively to the other, said color disk having a portion through which rays of light pass, and a stationary third member located behind the color disk and periodically visible through it.

3. The combination of a color disk having sight openings therein, a shield, means for rotating said shield and color disk and allowing one to move with reference to the other, a stationary supporting plate parallel therewith and adapted to carry a facing periodically visible through the color disk.

4. The combination of a rotatable shaft, a wheel loose thereon, a wheel of different size rigid on the shaft, an idler engaging the two wheels, to rotate the loose wheel at a different speed from the shaft, a color disk carried by the loose wheel, and a screen carried by the shaft.

5. The combination of a motor, a wheel rigid on the shaft thereof, a wheel loose on said shaft, an idler having one portion of its periphery engaging one wheel and another portion the other wheel, said peripheries being of different diameters to give a differential speed, a hub on said loose wheel, a nut screwed onto said hub, a color disk surrounding said hub clamped by said nut, and a shield carried by said shaft.

6. The combination of a shaft, a wheel loose on said shaft, gearing connecting the wheel and shaft for differential movement thereof, a hub on said loose wheel, a nut screwed onto said hub, a color disk surrounding said hub clamped by said nut, a head mounted on said shaft, a shield mounted on said head, a nut for holding said shield to said head, and a thumb screw for holding said head to said shaft.

7. The combination of a rotatable disk having transparent and opaque portions, a rotatable shield arranged in front of said disk also having transparent and opaque portions, said shield and disk rotating at different speeds, a stationary member behind said disk, and means for causing said disk and shield at times to have their transparent portions gradually coincide and part, thereby exposing the surface of the third member.

8. The combination of a rotatable disk having transparent and opaque portions, a rotatable shield arranged in front of said disk also having transparent and opaque portions, said shield and disk rotating at different speeds, a stationary member behind said disk, and means for causing the transparent portions of the disk and shield to overlap while rotating at a speed greater than the eye can detect in a single revolution, thereby exposing to the eye at one time the entire surface of the third member.

In testimony whereof, I hereunto affix my signature in the presence of two witnesses.

WILLIAM P. DUN LANY.

Witnesses:
   J. A. LANNERT,
   ALBERT H. BATES.